Sept. 1, 1925.  S. BAKOS  1,552,379

AUTOMOBILE WHEEL

Filed Nov. 19, 1924  2 Sheets-Sheet 1

Steve Bakos
INVENTOR

BY Victor J. Evans
ATTORNEY

WITNESS

Sept. 1, 1925.

S. BAKOS 1,552,379

AUTOMOBILE WHEEL

Filed Nov. 19, 1924    2 Sheets-Sheet 2

Steve Bakos
INVENTOR

BY Victor J. Evans
ATTORNEY

WITNESS

Patented Sept. 1, 1925.

1,552,379

UNITED STATES PATENT OFFICE.

STEVE BAKOS, OF ALPHA, NEW JERSEY.

AUTOMOBILE WHEEL.

Application filed November 19, 1924. Serial No. 750,907.

*To all whom it may concern:*

Be it known that I, STEVE BAKOS, a subject of the Republic of Hungary, residing at Alpha, in the county of Warren and State of New Jersey, have invented new and useful Improvements in Automobile Wheels, of which the following is a specification.

An object of this invention is the provision of a vehicle wheel having a solid rubber tire and of a construction to afford yieldability and consequently as much comfort to the occupants of the vehicle as would a pneumatic tired wheel.

A further object is the provision of a spring wheel of a novel and peculiar construction, in which the spokes thereof are in the nature of curved spring members secured between the hub and tire carrying rim in a novel and peculiar manner, and wherein a buffer member is employed to absorb abnormal shocks to which the wheel is subjected, and consequently prevent the breaking of the spring spokes.

With the above broadly stated objects in view and others, which will appear as the nature of the invention is better understood, reference is to be had to the drawings which accompany and which form part of this application.

In the drawings:—

Figure 1:
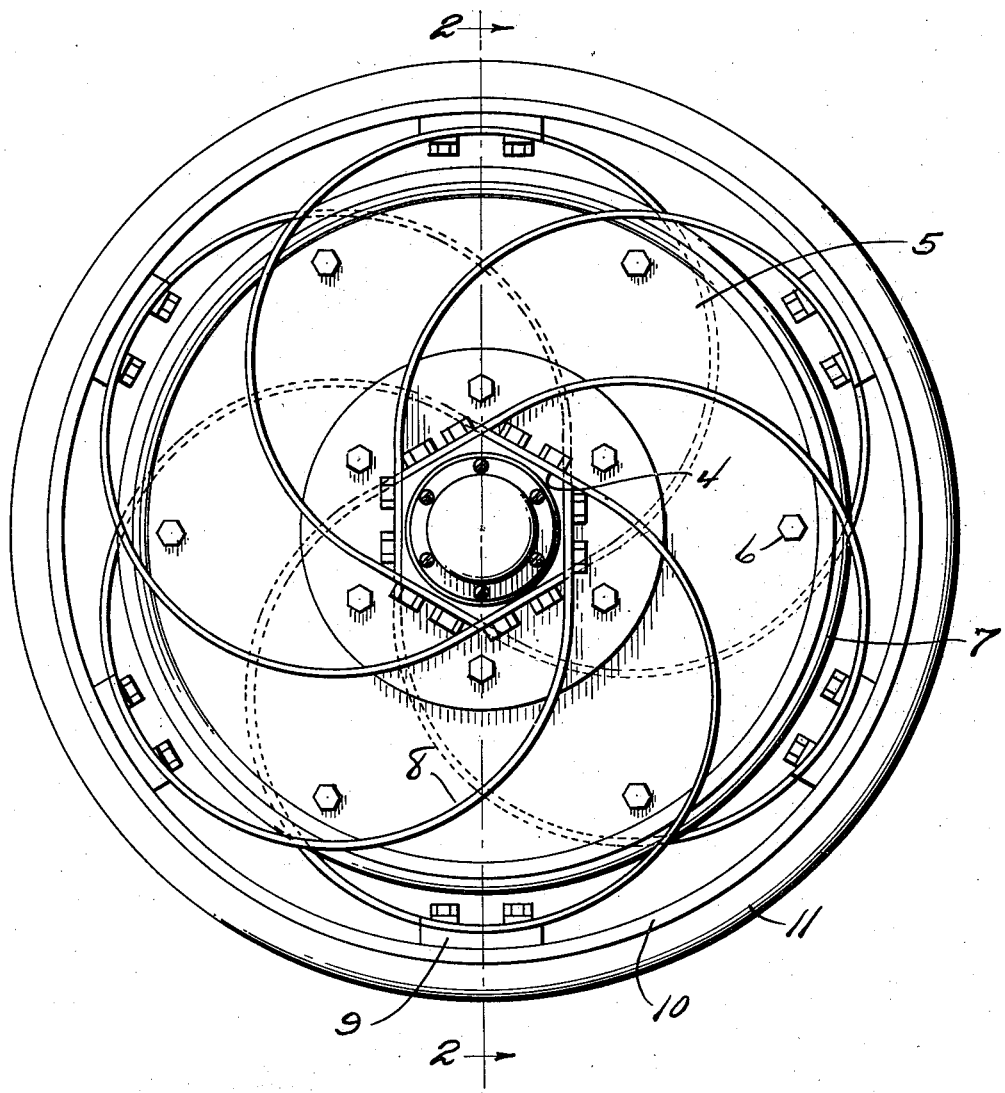
Figure 1 is a side elevation of a vehicle wheel in accordance with this invention.
Figure 3:
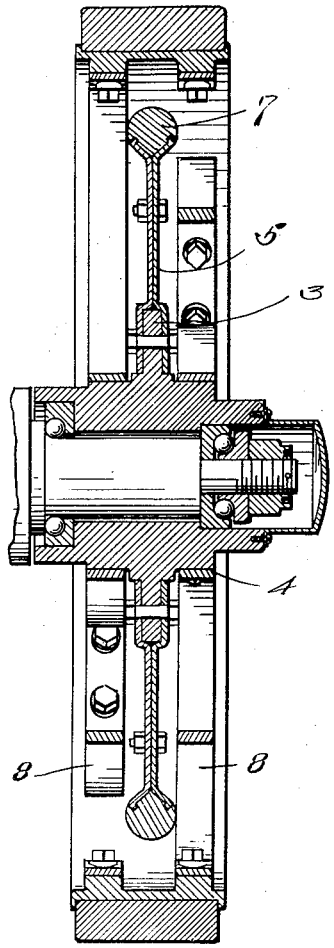
Figure 3 is a substantially similar sectional view through the front wheel of a vehicle embodying the invention.
Figure 2:
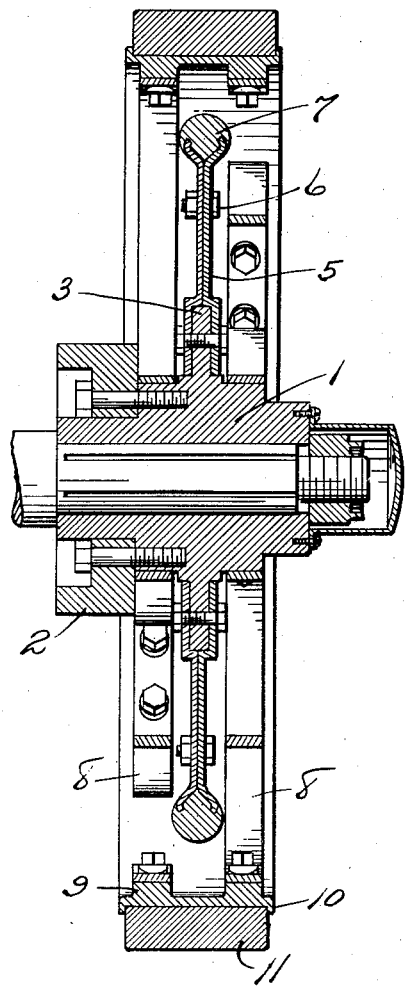
Figure 2 is a sectional view on the line 2—2 of Figure 1.

In the drawings, and with reference particularly to Figures 1 and 2 thereof, the hub of the wheel is broadly indicated by the numeral 1. The hub has its ends reduced, and surrounding the inner reduced portion and bolted on the hub, there is a brake drum 2.

The hub is centrally formed with an annular flange 3, and at the opposite sides of the flange the hub is peripherally formed with angularly arranged flat surfaces 4. These flat surfaces are arranged in a line with each other at the opposite sides of the flange, and in the showing of the drawings each of the surfaces describes a hexagon.

Bolted to the flange 3 there are the offset inner peripheral portions of plates 5. The plates have their outer and confronting surfaces bolted together, as at 6. The plates are round in elevation and will, for the sake of convenience, hereinafter be referred to as a disk. The plates constituting the disk have their outer ends rounded away from each other to provide a continuous depression in which is seated a ring 7, preferably of rubber or like compressible material. The ring 7 provides a buffer to absorb abnormal shocks to which the wheel may be subjected, as will presently be apparent.

Having one end bolted on each of the angle faces of the hexagonal portions of the hub there are curved springs 8. Each of these springs is bolted to the inner dished face of a block 9 integrally secured on the inner face of and adjacent to the edges of the tire carrying rim 10. By reference to the drawings it will be seen that one end of each of the spring spokes 8 is secured to one face of one of the hexagonal portions of the hub.

The rim 10 has beaded edges to receive therebetween a rubber tread 11.

The buffer ring 7 is disposed a suitable distance away from the inner face of the tire carrying rim 10. The spring spokes absorb normal shocks to which the wheel is subjected. When the wheel is subjected to abnormal shocks, the spokes will be compressed so that the ring buffer 7 will contact with the tire carrying rim between certain of the blocks 9, and in this manner liability of weakening or breaking of the spokes is effectively overcome.

Having described the invention, I claim:—

A vehicle wheel including a hub having peripheral hexagonal surfaces at the opposite sides of the center thereof, a tire carrying rim surrounding the hub, curved spring spokes secured to the faces of the hexagonal surfaces and to the tire carrying rim, and a buffer member between the hub and rim.

In testimony whereof I affix my signature.

STEVE BAKOS.